US012384158B2

(12) United States Patent
Ogawa et al.

(10) Patent No.: US 12,384,158 B2
(45) Date of Patent: Aug. 12, 2025

(54) LIQUID CONTAINER AND LIQUID DISCHARGE APPARATUS

(71) Applicant: BROTHER KOGYO KABUSHIKI KAISHA, Nagoya (JP)

(72) Inventors: Mikio Ogawa, Nagoya (JP); Rie Joboji, Nagoya (JP); Hideki Hayashi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 55 days.

(21) Appl. No.: 18/184,297

(22) Filed: Mar. 15, 2023

(65) Prior Publication Data

US 2023/0311518 A1 Oct. 5, 2023

(30) Foreign Application Priority Data

Mar. 31, 2022 (JP) ................................ 2022-057865

(51) Int. Cl.
*B41J 2/17* (2006.01)
*B41J 2/165* (2006.01)

(52) U.S. Cl.
CPC ......... *B41J 2/1721* (2013.01); *B41J 2/16552* (2013.01); *B41J 2/16526* (2013.01); *B41J 2/1735* (2024.05)

(58) Field of Classification Search
CPC .. B41J 2/1721; B41J 2/16552; B41J 2/16526; B41J 2/1735; B41J 2/175; B41J 2002/17516; B41J 2/17513
See application file for complete search history.

(56) References Cited

U.S. PATENT DOCUMENTS

| | | | |
|---|---|---|---|
| 5,400,066 A | 3/1995 | Matsumoto et al. | |
| 5,506,611 A * | 4/1996 | Ujita | B41J 2/17526 347/19 |
| 8,465,134 B2 | 6/2013 | Watanabe | |
| 2006/0290752 A1 | 12/2006 | Okamoto et al. | |
| 2007/0030304 A1 | 2/2007 | Yamada | |
| 2007/0115332 A1 | 5/2007 | Ishizawa et al. | |

FOREIGN PATENT DOCUMENTS

| | | |
|---|---|---|
| JP | H09-169123 A | 6/1997 |
| JP | H11-157099 A | 6/1999 |
| JP | 2002-234183 A | 8/2002 |
| JP | 2007-38590 A | 2/2007 |
| JP | 2008-49639 A | 3/2008 |
| JP | 2013-86487 A | 5/2013 |
| JP | 5210149 B2 | 6/2013 |
| JP | 2015-533693 A | 11/2015 |
| WO | 2014/049441 A1 | 4/2014 |

OTHER PUBLICATIONS

Extended European Search Report for the related European Patent Application No. 23161693.9 dated Aug. 1, 2023.

* cited by examiner

*Primary Examiner* — Lisa Solomon
(74) *Attorney, Agent, or Firm* — Kenealy Vaidya LLP

(57) ABSTRACT

There is provided a liquid container including: a pouch and a case. The pouch includes a flexible bag and a spout with a first opening. The case includes a tank to store a liquid flowed through the second opening. The spout is fitted into the case, and the bag is positioned in the tank.

13 Claims, 13 Drawing Sheets

LIQUID CONTAINER AND LIQUID DISCHARGE APPARATUS

REFERENCE TO RELATED APPLICATIONS

This application claims priority from Japanese Patent Application No. 2022-057865 filed on Mar. 31, 2022. The entire content of the priority application is incorporated herein by reference.

BACKGROUND ART

In an image recording apparatus of ink jet type, for example, it is possible to replace the cartridge containing an ink for refill with the ink. A publicly known liquid container is provided in a casing where a new ink is containable, the liquid container being expandable to receive waste ink.

DESCRIPTION

In an image recording apparatus, waste ink is produced, for example, in a purge process. The purge process serves to cause the ink to flow out of the nozzles by a positive pressure or negative pressure, in order to eliminate foreign substances and the like from the nozzles of a head. The purge process using the negative pressure may often bring air mixed into the waste ink. Therefore, because the waste ink and air will flow into the liquid container, the liquid container cannot be completely fulfilled with the waste ink, so as to bring about a problem of decreasing the storable amount of the waste ink.

The present disclosure is conceived in view of the above situation, and an object thereof is to provide a liquid container capable of containing liquid effectively in a pouch and a tank.

According to an aspect of the present disclosure, there is provided a liquid container including: a pouch and a case. The pouch includes a flexible bag and a spout with a first opening. The case includes a tank configured to store a liquid flowed through the second opening. The spout is fitted into the case, and the bag is positioned in the tank.

The liquid flowing in via the second opening is stored in the tank. The liquid having filled the bag of the pouch is positioned in the tank separately from the liquid stored in the tank.

An embodiment of the present disclosure will be explained below. Note that, needless to say, this embodiment presents merely one aspect of the present disclosure, and can undergo changes and modifications without departing from the true spirit and scope of the present disclosure. Further, in the following explanation, an up-down direction is defined on such a reference as with an image recording apparatus 100 being placed in a usable condition (the state of FIG. 1), a front-rear direction is defined regarding the side where a discharge port 33 is provided as the near side (or the front side), and a left-right direction is defined when the image recording apparatus 100 is viewed from the near side (the front side).

<Outer Appearance Configuration of the Image Recording Apparatus 100>

Figure 1:
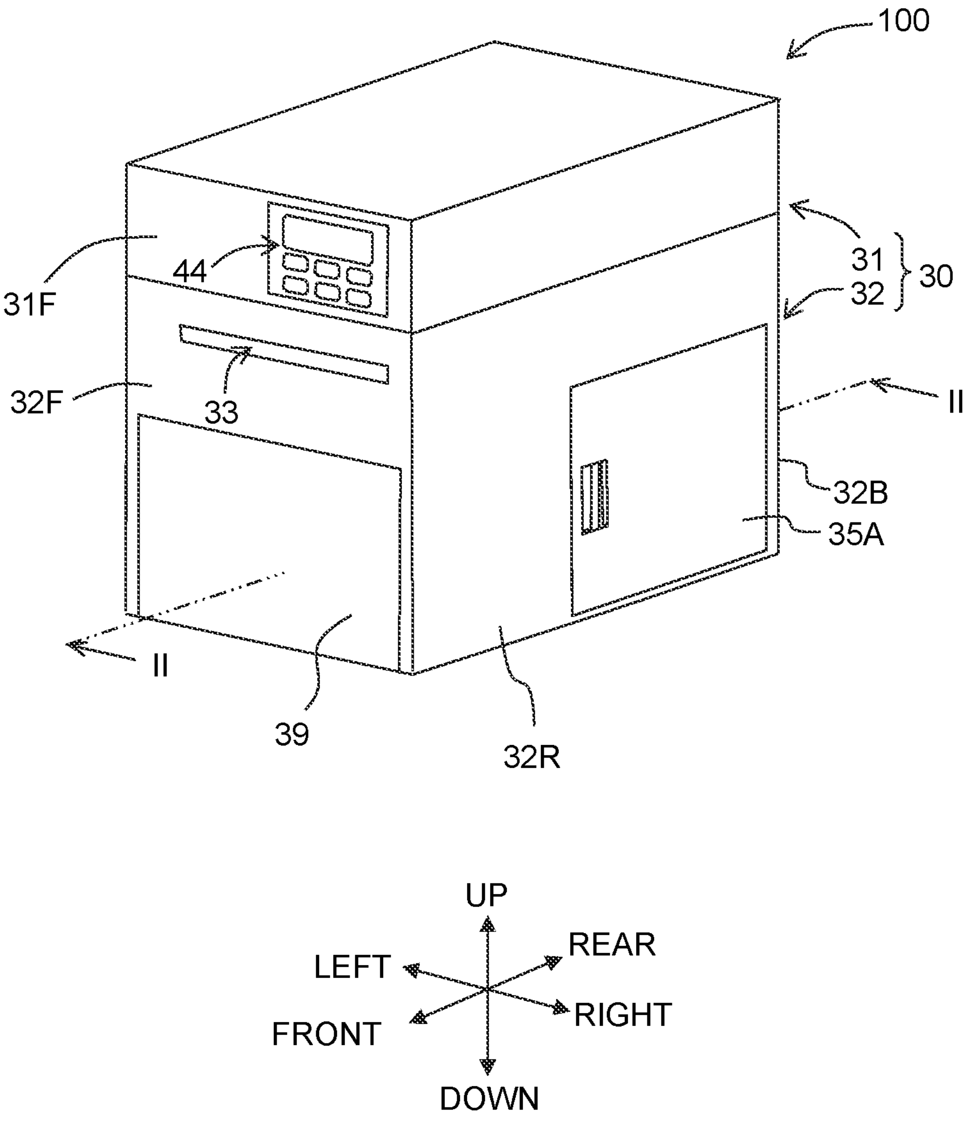
FIG. 1 is a perspective view of an outer appearance of an image recording apparatus 100 according to an embodiment of the present disclosure.

The image recording apparatus 100 (an example of the liquid discharge apparatus) depicted in FIG. 1 is configured to record an image on a sheet S of a roll 37 (see FIG. 2) by an ink jet recording method.

As depicted in FIG. 1, the image recording apparatus 100 includes a casing 30. The casing 30 includes an upper casing 31 and a lower casing 32. The upper casing 31 and the lower casing 32 are shaped into an approximate cuboid as a whole, and sized as disposable on a desk. That is, the image recording apparatus 100 is suitable to be placed on a desk for use. Of course, the image recording apparatus 100 may also be placed on a floor or rack for use. Note that in the casing 30, a frame may be provided appropriately for supporting every member.

Figure 2:
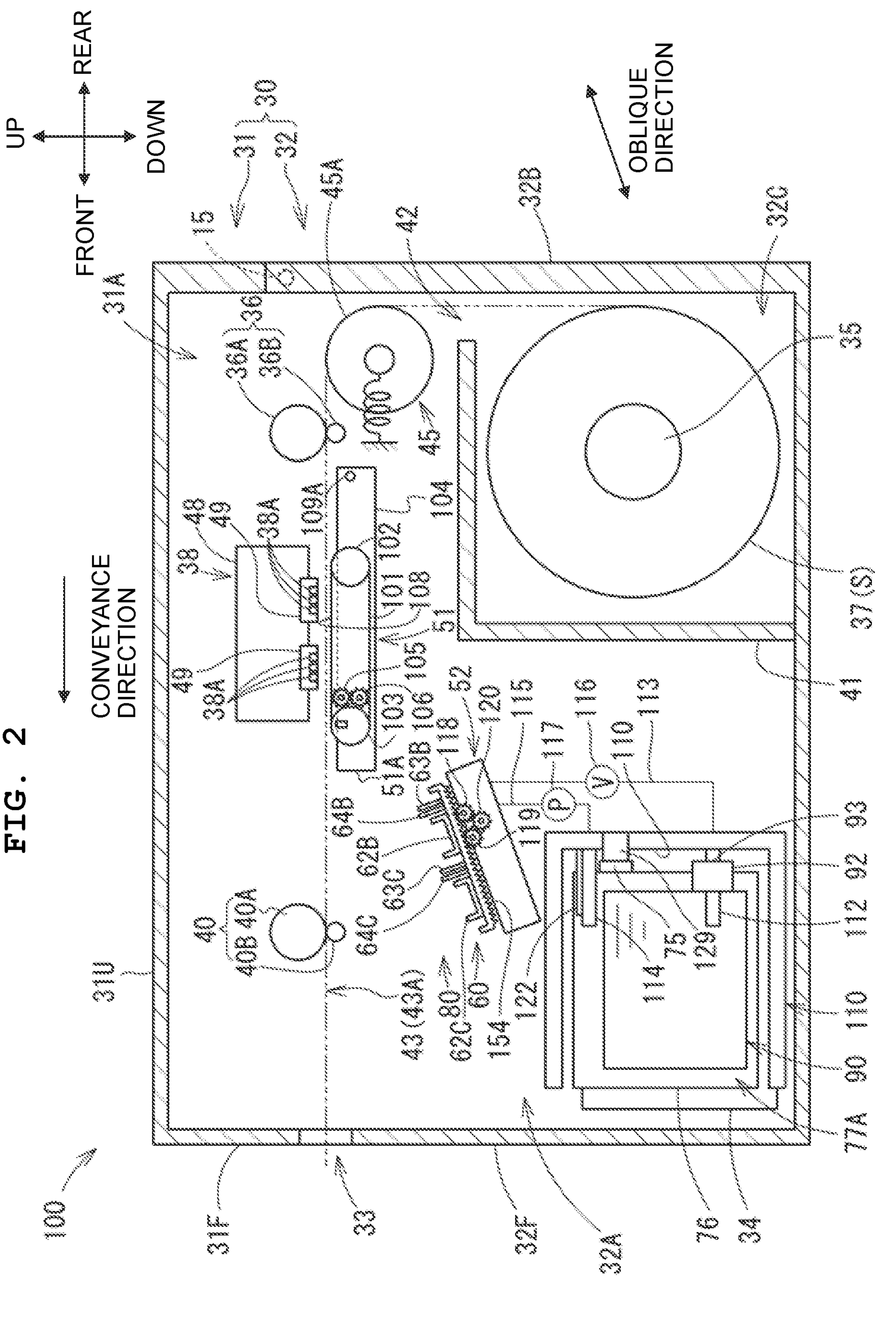
FIG. 2 is a cross section view depicting the cross section II-II of FIG. 1.

As depicted in FIG. 2, the upper casing 31 is supported by the lower casing 32 in a rotatable manner. The upper casing 31 is rotatable between an opened position and a closed position as depicted in FIG. 2 about a rotating shaft 15 provided at the lower end at the rear side to extend in the left-right direction. Note that the upper casing 31 is not limited to the configuration of rotating on the rotating shaft 15 but may be rotated on a hinge or the like, for example.

As depicted in FIG. 2, when the upper casing 31 is in the closed position, an internal space 31A of the upper casing 31 and an internal space 32A of the lower casing 32 are unexposed to the outside. When the upper casing 31 is in the opened position, the internal space 31A of the upper casing 31 and the internal space 32A of the lower casing 32 are exposed to the outside.

As depicted in FIG. 1, a front surface 32F of the lower casing 32 is formed with the slit-like discharge port 33 elongated in the left-right direction. The sheet S (see FIG. 2) finished with image recording is discharged from the discharge port 33.

A front surface 31F of the upper casing 31 is provided with an operation panel 44. A user can use the operation panel 44 for inputs in order to operate the image recording apparatus 100 and determine various settings.

As depicted in FIG. 1, a front cover 39 is positioned in the front surface 32F of the lower casing 32. The front cover 39 can let its upper end fall frontward to open about an unshown rotating shaft extending along the left-right direction in the vicinity of its lower end. The front cover 39 is opened and closed to expose and shield a cartridge installation unit 110 and the like (see FIG. 2) positioned in the internal space 32A of the lower casing 32.

<Internal Configuration of the Image Recording Apparatus 100>

As depicted in FIG. 2, in the internal spaces 31A and 32A, there are arranged a holder 35, a tensioner 45, a conveyance roller pair 36, a conveyance roller pair 40, a head unit 38, a first support mechanism 51, a second support mechanism 52, an ink tank 34, a liquid cleaner tank 76, a maintenance mechanism 60, and the like.

Note that, without illustration, a fixation unit, an image sensor, a cutter, and the like are positioned in the internal space 32A at the downstream side of the head unit 38 in a conveyance direction. The fixation unit is a heater or an ultraviolet radiator to fix the ink on the sheet S. If the fixation unit is a heater, then the ink contains a resin to form a film on the sheet S by heat. If the fixation unit is an ultraviolet radiator, then the ink contains a resin to be cured by ultraviolet radiation. The image sensor optically reads out the image recorded on the sheet S and outputs an image data to a controller 130 to express the readout result. The cutter serves to cut the sheet S finished with image recording.

A partition wall 41 is provided in the internal space 32A. The partition wall 41 partitions a rear lower part of the lower casing 32 to define the sheet accommodation space 32C. The sheet accommodation space 32C is enclosed by the partition wall 41 and the lower casing 32 to become a space secluded from the head unit 38 and the like.

The roll 37 is accommodated in the sheet accommodation space 32C. The roll 37 has a core pipe and the elongate sheet S. The sheet S is rolled around the core pipe into a roll shape in a circumferential direction of the axial core of the core pipe. The sheet S may be as wide as from the minimum width to the maximum width at which the image recording apparatus 100 can record images. That is, the sheet accommodation space 32C can accommodate the roll 37 of a plurality of types with different widths. Note that the roll 37 may not have a core pipe such that the sheet S may be rolled on the holder 35 in a removable manner into a roll shape. Further, the sheet accommodation space 32C may also accommodate fanfold paper. As depicted in FIG. 1, a right cover 35A is positioned in a right surface 32R of the lower casing 32. The right cover 35A is opened and closed to expose and shield the holder 35 and the like positioned in the sheet accommodation space 32C.

As depicted in FIG. 2, the sheet accommodation space 32C is open upward at the rear side. In detail, an interspace 42 is formed between the partition wall 41 and a rear surface 32B, that is, in an upper part at the rear side of the roll 37. The conveyance roller pairs 36 and 40 rotate to pull out the sheet S upward from the rear end of the roll 37 and guide the same to a tensioner 45 via the interspace 42.

The tensioner 45 is positioned above the partition wall 41 in a rear part of the internal space 32A. The tensioner 45 has an outer circumference 45A facing the outside of the lower casing 32. The outer circumference 45A is sized to be larger than the maximum width of the sheet in the left-right direction, and shaped symmetrically to the center of paper passage (the center of the sheet S in the left-right direction). The upper end of the outer circumference 45A is positioned at almost the same vertical level as a nip D of the conveyance roller pair 36 in the up-down direction.

The sheet S pulled out from the roll 37 is brought on in contact with the outer circumference 45A. The sheet S is curved frontward along the outer circumference 45A, extending in a conveyance direction to be guided to the conveyance roller pair 36. The conveyance direction is a frontward orientation along the front-rear direction. The tensioner 45 applies a tension to the sheet S by a publicly known method.

The conveyance roller pair 36 is positioned in front of the tensioner 45. The conveyance roller pair 36 has a conveyance roller 36A and a pinch roller 36B. The conveyance roller 36A is in contact with the pinch roller 36B at almost the same vertical level as the upper end of the outer circumference 45A.

The conveyance roller pair 40 is positioned in front of the conveyance roller pair 36. The conveyance roller pair 40 has a conveyance roller 40A and a pinch roller 40B. The conveyance roller 40A is in contact with the pinch roller 40B at almost the same vertical level as the upper end of the outer circumference 45A.

A driving force is transmitted from an unshown motor to the conveyance rollers 36A and 40A to rotate the same. The conveyance roller pair 36 in rotation nips the sheet S extending from the tensioner 45 in the conveyance direction to send out the same in the conveyance direction along a conveyance surface 43A. The conveyance roller pair 40 in rotation nips the sheet S sent out from the conveyance roller pair 36 to send out the same in the conveyance direction. Further, the conveyance roller pairs 36 and 40 rotate to pull out the sheet S toward the tensioner 45 through the interspace 42 from the sheet accommodation space 32C.

As depicted in FIG. 2, a conveyance path 43 is formed in the internal space 32A from the upper end of the outer circumference 45A to the discharge port 33. The conveyance path 43 is a space through which the sheet S is passable, extending almost linearly along the conveyance direction. In detail, the conveyance path 43 expands in the conveyance direction and the left-right direction and along the long conveyance surface 43A in the conveyance direction. Note that in FIG. 2, the conveyance surface 43A is depicted with a two-dot chain line in depicting the conveyance path 43. The conveyance path 43 is defined by guide members (not shown) positioned apart from each other in the up-down direction, the head unit 38, a conveyance belt 101, and the like.

The head unit 38 is positioned downstream from the conveyance roller pair 36 in the conveyance direction and above the conveyance path 43. The head unit 38 has a head module 49 having a plurality of nozzles 38A. From the plurality of nozzles 38A, an ink is discharged downward toward the sheet S supported by a conveyance belt 101. By virtue of this, image is recorded on the sheet S.

The first support mechanism 51 is positioned below the conveyance path 43 at the downstream side of the conveyance roller pair 36 in the conveyance direction. The first support mechanism 51 faces the head unit 38 from below the head unit 38. The first support mechanism 51 has the conveyance belt 101 and a supporter 104. The conveyance belt 101 supports the sheet S positioned right below the head unit 38 and conveyed by the conveyance roller pair 36 in the conveyance direction. The conveyance belt 101 conveys the supported sheet S in the conveyance direction. The supporter 104 can support the maintenance mechanism 60.

The second support mechanism 52 is positioned below the conveyance roller pair 40 and fixed inside the lower casing 32 by being supported by the lower casing 32. The second support mechanism 52 can support the maintenance mechanism 60.

The ink tank 34 stores the ink. The ink is a liquid containing a pigment and the like. The ink has a viscosity suitable for uniform dispersion of the pigment. The pigment serves to provide a color to the ink. The ink is supplied from the ink tank 34 to the head unit 38 through an unshown tube.

The liquid cleaner tank 76 stores a liquid cleaner. The liquid cleaner is used in cleaning the nozzles 38A of the head unit 38. The liquid cleaner tank 76 is also used for storing the liquid cleaner as a waste liquid having been used for cleaning the nozzles 38A.

Figure 13:
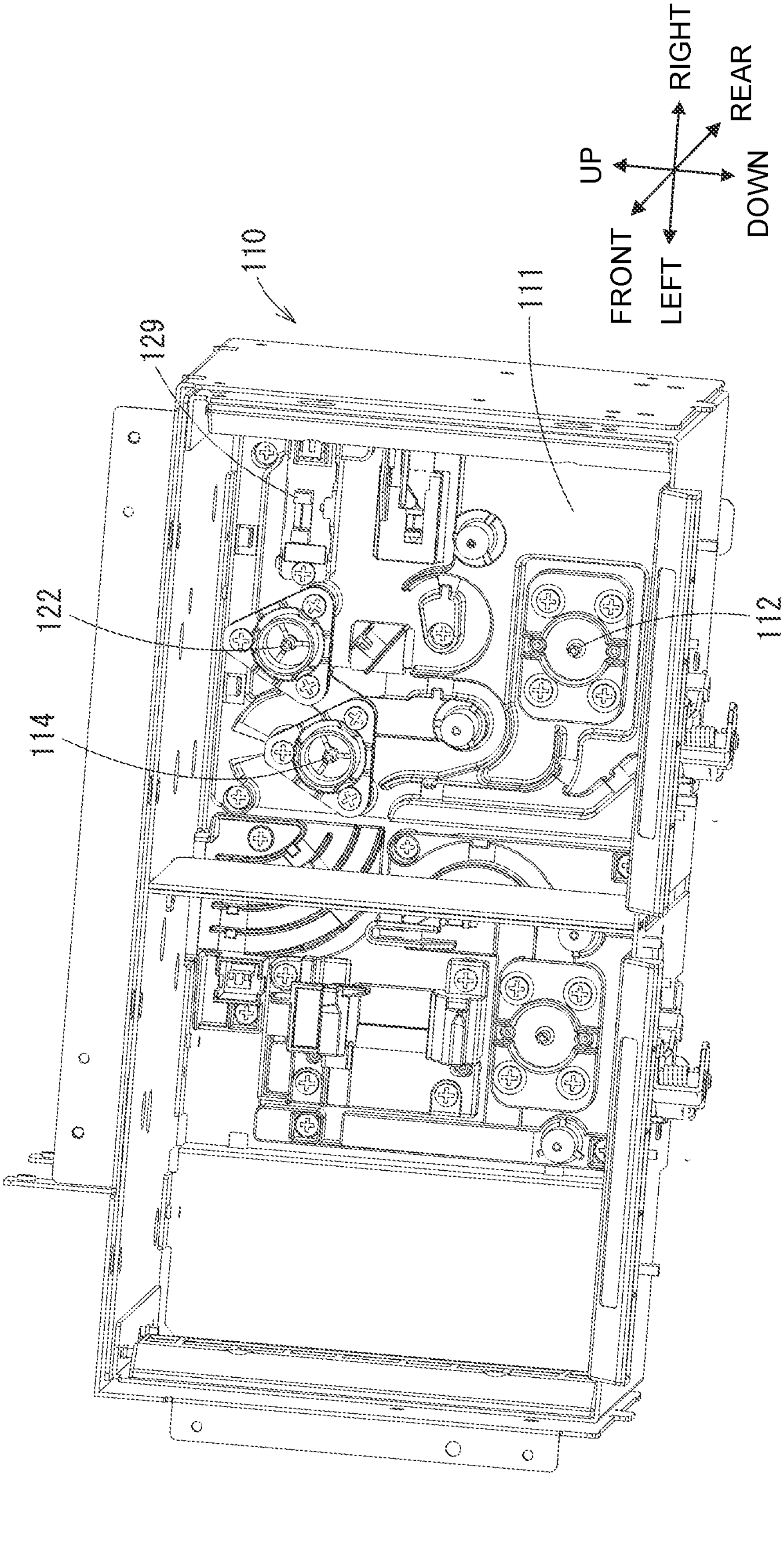
FIG. 13 is a perspective view of a cartridge installation unit 110.

As depicted in FIGS. 2 and 13, the cartridge installation unit 110 is box-like and open frontward, being positioned in the vicinity of the front end and the lower end of the lower casing 32. The liquid cleaner tank 76 is inserted rearward into the cartridge installation unit 110. A supply needle 112 (an example of the first needle) is positioned on a rearward end surface 111 of the cartridge installation unit 110 to extend frontward. The supply needle 112 is open at the front end, and linked to a flow channel 113 at the rear end. The flow channel 113 is linked with a supply tube 175 which will be descried later on. A valve 116 is positioned in the flow channel 113 to open and close the flow channel 113. A discharge needle 114 (an example of the second needle) is positioned on the rearward end surface 111 of the cartridge installation unit 110 to extend frontward. The front end of the discharge needle 114 is open and the rear end is linked with a flow channel 115. The flow channel 115 is connected with a waste liquid tube 178 which will be described later on. A suction pump 117 is positioned in the flow channel 115. An atmosphere communication needle 122 is positioned on the end surface 111 of the cartridge installation unit 110 to extend frontward. The front end of the atmosphere communication needle 122 is open and the rear end is in communication with the internal space of the casing 30 through an unshown flow channel. An optical sensor 129 is positioned on the end surface 111 of the cartridge installation unit 110. In the optical sensor 129, a light emitter and a light receiver are aligned at an interval in the left-right direction.

If the liquid cleaner tank 76 is installed into the cartridge installation unit 110, then the supply needle 112 is inserted into a supply hole 93 (see FIG. 6) of the liquid cleaner tank 76. By virtue of this, the liquid cleaner stored in the pouch 90 of the liquid cleaner tank 76 is supplied to the maintenance mechanism 60 via the supply needle 112, the flow channel 113, and the supply tube 175. Further, the discharge needle 114 is inserted into an inflow hole 73 (see FIG. 6) of the liquid cleaner tank 76. By virtue of this, the waste liquid flowing out of the maintenance mechanism 60 is discharged to a tank 77A of the liquid cleaner tank 76 via the waste liquid tube 178, the flow channel 115, and the discharge needle 114. Further, the atmosphere communication needle 122 is inserted into an atmosphere communication hole 72 of the liquid cleaner tank 76. By virtue of this, the tank 77A comes into atmospheric communication with the outside. Further, an indicator 75 is positioned between the light emitter and the light receiver of the optical sensor 129. By virtue of this, the amount of the waste liquid in the indicator 75 is detected by the optical sensor 129. The flow channel 113 and the supply tube 175 are an example of the first liquid circuit. The flow channel 115 and the waste liquid tube 178 are an example of the second liquid circuit.

Note that an installation case similar to the cartridge installation unit 110 is also provided for the ink tank 34, but any detailed explanation is omitted here therefor. The ink tank 34 stores the ink. The ink is a liquid containing a pigment and the like. The ink has a viscosity suitable for uniform dispersion of the pigment. The pigment serves to provide a color to the ink. The ink tank 34 is removed from the cartridge installation unit 110 if the ink is used up, and replaced by a new one storing the ink.

The maintenance mechanism 60 serves for maintaining the head unit 38. The maintenance mechanism 60 is configured to be movable and moved right below the head unit 38 when the maintenance is carried out for the head unit 38 (see FIG. 5).

Figure 5:
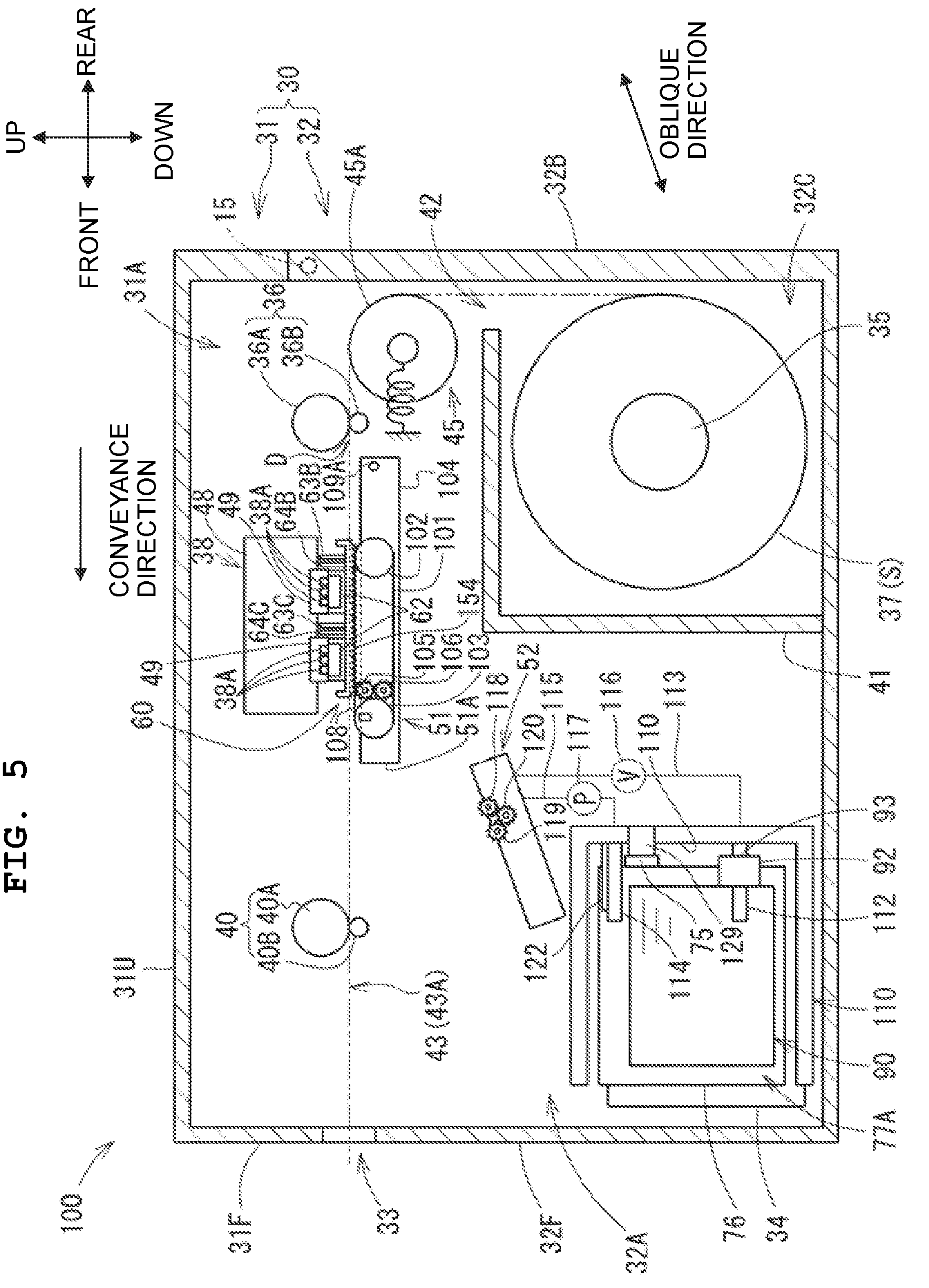
FIG. 5 is a cross section view depicting the cross section II-II of FIG. 1, and depicting a state where the first support mechanism 51 is in a first rotating position and the maintenance mechanism 60 is in a maintenance position.

The maintenance of the head unit 38 includes a purge process, an immersion process, a wiping process, and the like. The purge process serves, as depicted in FIG. 5, to suck the ink from the nozzles 38A with a suction pump with the nozzles 38A being covered by a cap 62 of the maintenance mechanism 60. The immersion process serves to immerse the nozzles 38A in the liquid cleaner supplied to the cap 62 with the nozzles 38A being covered by the cap 62. The wiping process serves to wipe a lower surface 50 of the head module 49 of the head unit 38 with a sponge wiper 64 and a rubber wiper 63 of the maintenance mechanism 60.

<Maintenance Mechanism 60>

Figure 3:
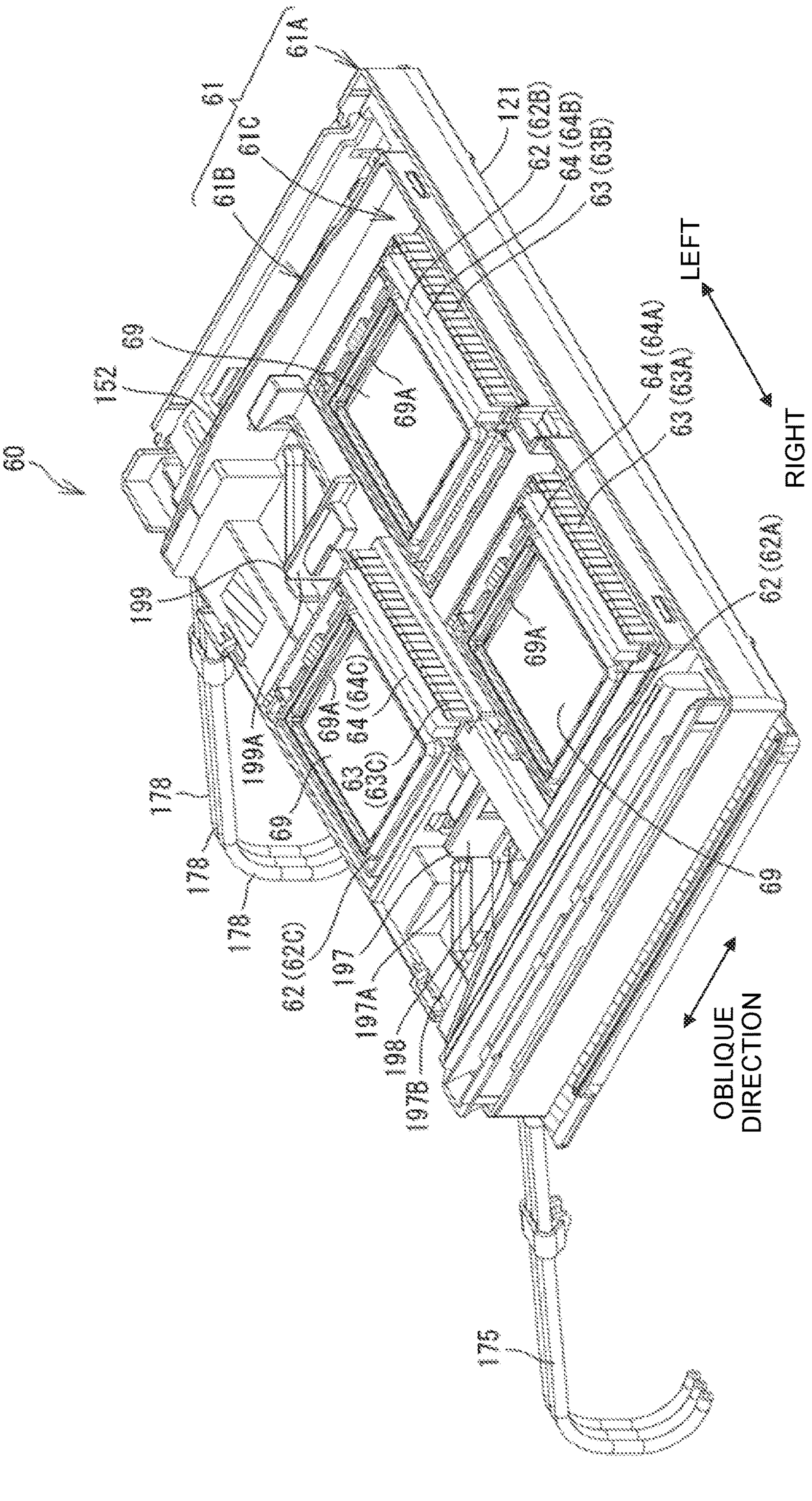
FIG. 3 is a perspective view of a maintenance mechanism 60.

As depicted in FIG. 3, the maintenance mechanism 60 includes a support 61, the sponge wiper 64, the rubber wiper 63, and the cap 62. Note that in the following explanation of the maintenance mechanism 60, the maintenance mechanism 60 is supported by the second support mechanism 52.

<Support 61>

The support 61 has a base 61A, a main body 61B mounted on the base 61A, and a wiper holder 61C holding the sponge wiper 64 and the rubber wiper 63 on the main body 61B. The base 61A has a box-like shape with its top being open.

A lower surface 121 of the base 61A is contactable with the upper surface of the first support mechanism 51 from above. By virtue of this, the maintenance mechanism 60 can be supported by the first support mechanism 51. Further, the lower surface 121 is contactable with the upper surface of the second support mechanism 52 from above. By virtue of this, the maintenance mechanism 60 can be supported by the second support mechanism 52.

As depicted in FIG. 2, the base 61A includes a rack 154. The rack 154 is formed at the right end of the lower surface 121 of the base 61A. The rack 154 can engage a gear 105. With the rack 154 and the gear 105 being engaged, rotation of the gear 105 moves the maintenance mechanism 60 in the front-rear direction with respect to the first support mechanism 51.

As depicted in FIG. 2, the rack 154 can engage a gear 118 and a gear 119. With the gear 105 in rotation under the condition of at least one of the gear 118 and the gear 119 being engaged with the rack 154, the maintenance mechanism 60 slides on the second support mechanism 52.

By virtue of this, the maintenance mechanism 60 is movable between the standby position depicted in FIG. 2, and the maintenance position depicted in FIG. 5. The maintenance mechanism 60 in the maintenance position or in the wiping position faces the lower surface 50 of the head module 49 of the head unit 38 in the up-down direction.

The main body 61B is approximately box-like in shape and open at the top. The main body 61B is smaller than the base 61A. The main body 61B is fixed on the base 61A when mounted on the base 61A. The main body 61B is formed with a flow channel allowing for communication of the liquid cleaner stored in the liquid cleaner tank 76. The flow channel is supplied with the liquid cleaner from the liquid cleaner tank 76 via the supply tube 175, and the waste liquid is discharged from the flow channel to the liquid cleaner tank 76 via the waste liquid tube 178. The liquid cleaner is supplied to the sponge wiper 64 via the flow channel.

The wiper holder 61C holds three sponge wipers 64A, 64B, and 64C, three rubber wipers 63A, 63B, and 63C, and three caps 62A, 62B, and 62C, respectively. A sponge wiper 64 is formed of a sponge being a porous body absorbing and holding liquids. In this embodiment, three sponge wipers 64 (64A, 64B, and 64C) are provided. Note that the number of sponge wipers 64 is not limited to three but is set according to the number of head modules 49 of the head unit 38 described earlier on. Hereinbelow, the three sponge wipers 64A, 64B, and 64C will also be referred to as the sponge wiper 64, collectively. The sponge wiper 64 is a long cuboid longer in the left-right direction than in an oblique direction and in the up-down direction. The sponge wiper 64 is longer in the up-down direction than in the oblique direction. A lower part of the sponge wiper 64 enters into the flow channel of the main body 61B.

The rubber wiper 63 is formed of a rubber being an elastic body absorbing liquids but not holding the same. In this embodiment, three rubble wipers 63 (63A, 63B, and 63C) are provided. Note that the number of rubber wipers 63 is not limited to three but is set according to the number of head modules 49 of the head unit 38 described earlier on. Hereinbelow, the three rubber wipers 63A, 63B, and 63C will also be referred to as the rubber wiper 63, collectively.

The rubber wiper 63 is formed into a plate-like shape expanding in the up-down direction and the left-right direction. The rubber wiper 63 is shorter in the oblique direction than the sponge wiper 64 in the oblique direction. By virtue of this, the rubber wiper 63 becomes more likely to flex on contacting with the lower surface 50 of the head module 49 in the wiping process. The rubber wiper 63 is a little longer in the left-right direction than the sponge wiper 64 in the left-right direction.

The cap 62 is made of an elastic material such as rubber, silicon, or the like. The cap 62 is box-like and open at the top. In this embodiment, the cap 62 is constructed from three caps (62A, 62B, and 62C). Note that the number of caps 62 is not limited to three but is set according to the number of head modules 49 of the head unit 38 described earlier on. Hereinbelow, the three caps 62A, 62B, and 62C will also be referred to as the cap 62, collectively.

A bottom plate 69 of the cap 62 is formed with an inflow port (not shown) for the liquid cleaner to flow into the cap 62, and an outflow port A for the liquid cleaner to flow out of the cap 62. The inflow port is connected with one end of the supply tube 175. The other end of the supply tube 175 is connected to the liquid cleaner tank 76. The outflow port is connected to one end of the waste liquid tube 178. The other end of the waste liquid tube 178 is connected to the liquid cleaner tank 76. With the suction pump 117 being driven, the liquid is sucked from the outflow port of the cap 62 to the liquid cleaner tank 76.

<Movement of the Maintenance Mechanism 60>

The maintenance mechanism 60 is movable between the standby position and the cleaning end position along the oblique direction in the form of sliding on the second support mechanism 52 and being supported by the second support mechanism 52.

As depicted in FIG. 2, the maintenance mechanism 60 in the standby position is positioned at the front side of a rotating leading end 51A of the first support mechanism 51 (the downstream side in the conveyance direction). In other words, the maintenance mechanism 60 in the standby position is positioned at the opposite side to a shaft 109A of the first support mechanism 51 with respect to the rotating leading end 51A of the first support mechanism 51. The maintenance mechanism 60 in the standby position is supported on the second support mechanism 52. On this occasion, the rack 154 is engaged with both the gears 118 and 119.

The maintenance mechanism 60 is movable between the standby position and the maintenance position by overpass between the second support mechanism 52 and the first support mechanism 51 in the second rotating position. The standby position is where the maintenance mechanism 60 has withdrawn from the maintenance position.

Figure 4:
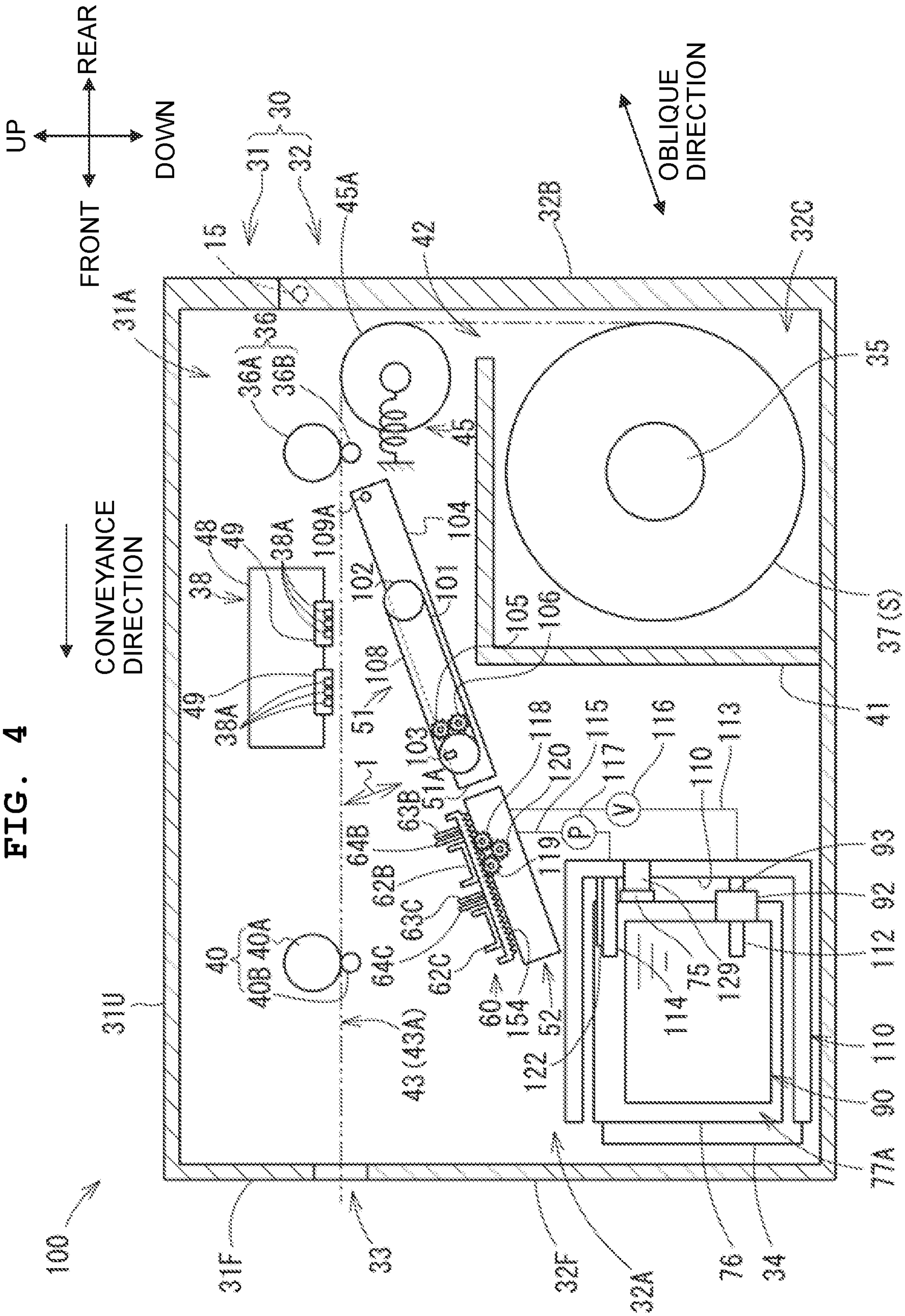
FIG. 4 is a cross section view depicting the cross section II-II of FIG. 1, and depicting a state where a first support mechanism 51 is in a second rotating position and the maintenance mechanism 60 is in a standby position.

With an unshown motor being driven, the first support mechanism 51 comes to the second rotating position as depicted in FIG. 4. In this state, with the unshown motor being driven, if a gear 120 rotates counterclockwise in FIG. 4, then the gears 118 and 119 rotate clockwise in FIG. 4. By virtue of this, the maintenance mechanism 60 in the standby position moves in a rearward orientation 4.

With the maintenance mechanism 60 being supported only by the first support mechanism 51, and with the motor being driven, the first support mechanism 51 is rotated from the second rotating position to the first rotating position. By virtue of this, as depicted in FIG. 5, the maintenance mechanism 60 comes to the maintenance position. The maintenance mechanism 60 in the maintenance position is positioned between the head unit 38 and the first support mechanism 51 in the first rotating position. Note that if the maintenance mechanism 60 moves from the maintenance position to the standby position, then the operation opposite to the above is carried out.

The maintenance mechanism 60 is movable between the maintenance position and the wiping position by way of sliding with respect to the first support mechanism 51 and being supported by the first support mechanism 51 in the first rotating position. The wiping position is at the front side of the maintenance position (at the standby side). That is, the first support mechanism 51 can support the maintenance mechanism 60 positioned in the maintenance position, in the wiping position, and between the two positions.

<Image Recording Process>

Hereinbelow, an explanation will be made on a process of recording an image on the sheet S (the image recording process).

When the image recording process is not carried out, the image recording apparatus 100 is in the standby state. In the standby state, as depicted in FIG. 5, the head unit 38 is in the capped position, the first support mechanism 51 is in the first rotating position supporting the maintenance mechanism 6, and the maintenance mechanism 60 is in the maintenance position. On this occasion, the cap 62 covers the nozzles 38A.

If the controller of the image recording apparatus 100 receives a command to record an image on the sheet S from outside such as from an information processing device or the like connected with the operation panel 44 and the image recording apparatus 100 via the LAN or the like, then the maintenance mechanism 60 is moved to the standby position from the maintenance position. Then, the first support mechanism 51 is rotated from the second rotating position to the first rotating position.

Next, conveying the sheet S is started such that the ink is discharged from the nozzles 38A with the sheet S being positioned right below the head unit 38. By virtue of this, the image is recorded on the sheet S.

<Purge Process>

Hereinbelow, the purge process for sucking the ink from the nozzles 38A will be explained.

When the image recording process is not carried out, the image recording apparatus 100 is in the standby state. In the standby state, as depicted in FIG. 5, the first support mechanism 51 is in the first rotating position supporting the maintenance mechanism 6, and the maintenance mechanism 60 is in the maintenance position. On this occasion, the cap 62 covers the nozzles 38A.

The purge process is carried out on receiving a command from the outside or at a predetermined timing in the standby state, for example. The following explanation will be made on the process of the controller 130 receiving the command to carry out the purge process when the image recording apparatus 100 is in the standby state.

In the purge process, if the suction pump is driven, then the ink in the nozzles 38A is sucked, and discharged from the space formed by the cap 62 and the lower surface 50 of the head module 49, to the liquid cleaner tank 76, via the waste liquid tube 178. By virtue of this, the nozzles 38A are prevented from clogging due to solidification of the ink.

<Wiping Process>

After the purge process, the wiping process is carried out for the sponge wiper 64 and the rubber wiper 63 to wipe the lower surface 50 of the head module 49 of the head unit 38. By moving the head unit 38 upward, the cap 62 departs from the lower surface 50 of the head module 49.

Next, the suction pump is driven to supply the liquid cleaner to the sponge wiper 64 from the liquid cleaner tank 76 via the supply tube 175.

Next, the maintenance mechanism 60 is moved from the maintenance position to the wiping position. In the course of the maintenance mechanism 60 being moved from the maintenance position to the wiping position, the sponge wiper 64 and the leading end (the upper end) of the rubber wiper 63 is in contact with the lower surface 50 of the head module 49 while sliding thereon. By virtue of this, the lower surface 50 of the respective head modules 49A, 49B, and 49C is wiped. As a result, liquids, foreign substances and the like attached on the lower surface 50 are removed.

<Capping Process>

In the capping process, the suction pump 117 is driven to supply the liquid cleaner to the caps 62A, 62B, and 62C via the supply tube 175 from the liquid cleaner tank 76. Thereafter, the head unit 38 is driven downward to let the cap 62 contact with the lower surface 50 of the head module 49. By virtue of this, the nozzles 38A are put into a space where the liquid cleaner exists, such that the ink in the nozzles 38A is less likely to get dried. The head unit 38 moves downward to cause the cap 62 to depart from the lower surface 50 of the head module 49. On this occasion, the liquid cleaner in the caps 62A, 62B, and 62C is discharged to the liquid cleaner tank 76.

<Liquid Cleaner Tank 76>

The liquid cleaner tank 76 (an example of the liquid container) stores the liquid cleaner. The liquid cleaner includes an organic solvent, a surfactant, water, and the like. The liquid cleaner tank 76 is also a space storing the waste liquid. In the liquid cleaner tank 76, the liquid cleaner is stored in the pouch 90 while the waste liquid is stored in the case body 77 outside of the pouch 90. The liquid cleaner tank 76 will be removed from the cartridge installation unit 110 if the liquid cleaner is consumed up or the waste liquid gets to the full level, and a new liquid cleaner tank 76 will replace the old one.

As depicted in FIGS. 6 to 10, the liquid cleaner tank 76 has the case body 77, a cover 78, the film 79, and the pouch 90. Note that in the following explanation, the up-down direction, the front-rear direction and the left-right direction based on the liquid cleaner tank 76 are defined according to the respective directions of the casing 30, with the liquid cleaner tank 76 being installed in the cartridge installation unit 110. The case body 77, the cover 78, and the film 79 are an example of the case.

The case body 77 is box-like, having an upward opening 81. The case body 77 has a lower wall 82, a front wall 83, a rear wall 84 (an example of the lateral wall), a left wall 85, and a right wall 86. The lower wall 82 is rectangular, and elongate in the front-rear direction as viewed in the up-down direction. The front wall 83 extends upward from the front end of the lower wall 82. The front wall 83 is formed with a recess 83A recessing rearward. The recess 83A is open in the lower wall 82, too. The recess 83A serves as the handle for a user to draw out the case body 77. The rear wall 84 extends upward from the rear end of the lower wall 82.

The left wall 85 extends upward from the left end of the lower wall 82 to link the front wall 83 and the rear wall 84. The right wall 86 extends upward from the right end of the lower wall 82 to link the front wall 83 and the rear wall 84.

Figure 9:
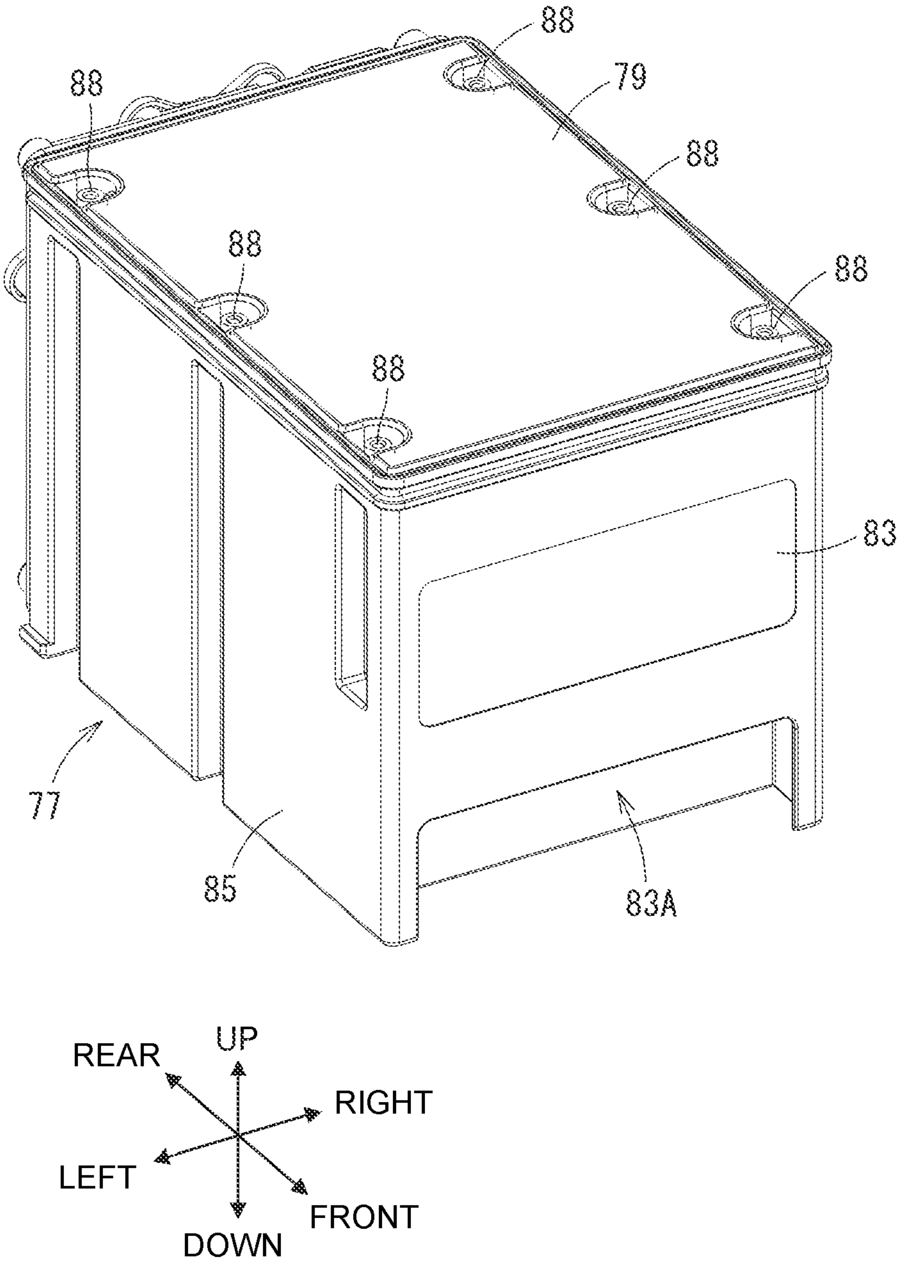
FIG. 9 is a perspective view depicting a case body 77 and a film 79.
Figure 10:
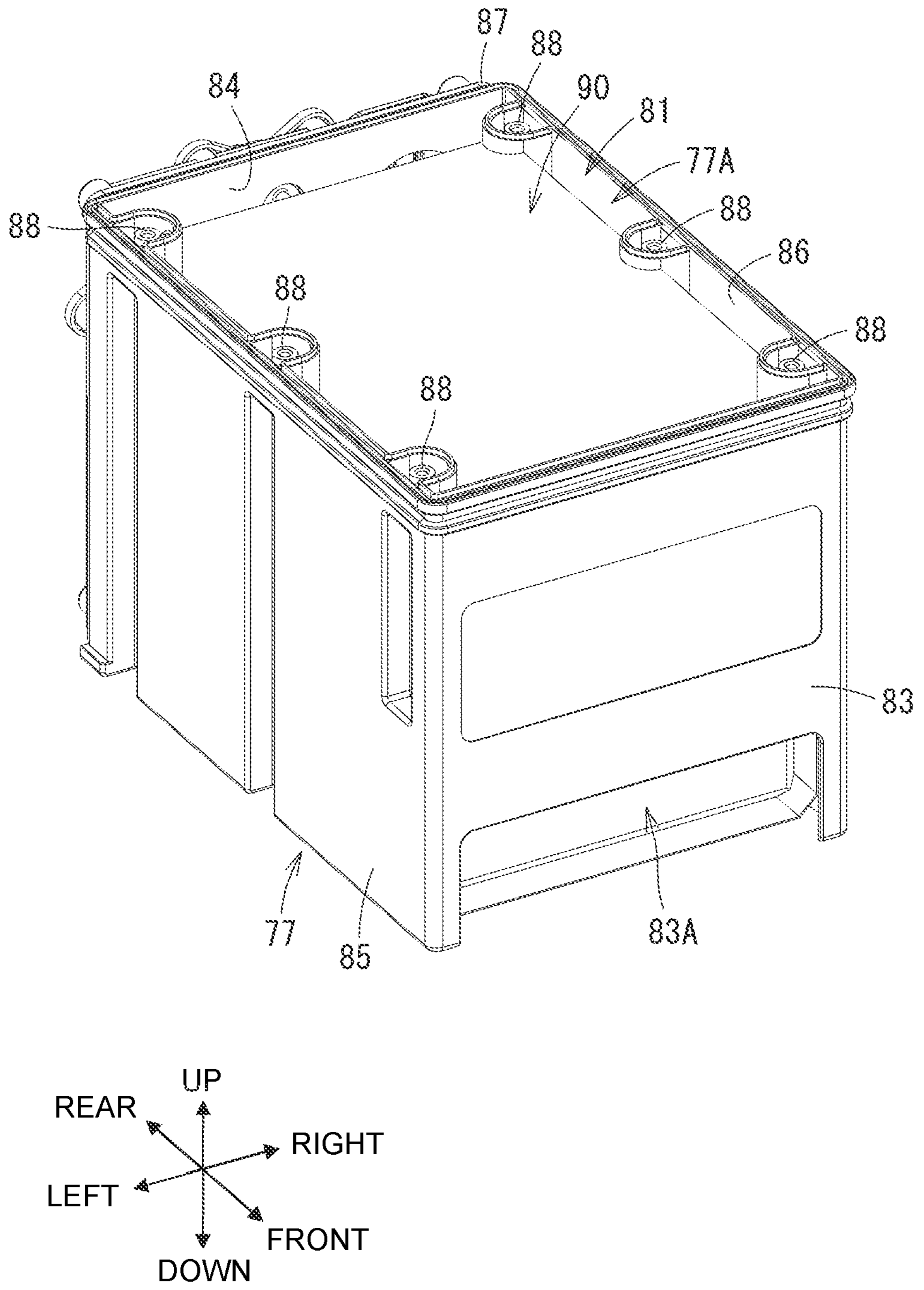
FIG. 10 is another perspective view depicting the case body 77.

As depicted in FIG. 9, the opening 81 is defined by the upper end of the front wall 83, the upper end of the rear wall 84, the upper end of the left wall 85, and the upper end of the right wall 86. The opening 81 lets the internal space of the case body 77 be exposed to the outside. The internal space of the case body 77 forms the tank 77A. On the upper end of the front wall 83, the upper end of the rear wall 84, the upper end of the left wall 85, and the upper end of the right wall 86 defining the opening 81, a welding surface 87 is positioned for welding the film 79. The welding surface 87 is formed into a rectangular shape enclosing the opening 81. As depicted in FIG. 10, with the film 79 being welded on the welding surface 87, the opening 81 is sealed tightly.

At the outside of the welding surface 87, three screw holes 88 aligning in the front-rear direction are positioned to form two arrays separated in the left-right direction. In other words, three screw holes 88 align in the front-rear direction on the upper end of the left wall 85, the other three screw holes 88 align in the front-rear direction on the upper end of the right wall 86.

The film 79 welded on the case body 77 is covered by the cover 78. The cover 78 has a plate-like rectangular shape in contact with the upper end of the front wall 83, the upper end of the rear wall 84, the upper end of the left wall 85, and the upper end of the right wall 86. Three through holes 89 aligning in the front-rear direction are positioned to form two arrays separated in the left-right direction. The through holes 89 are arranged to correspond to the screw holes 88. With the cover 78 covering the film 79, the screws 94 are inserted into the through holes 89 and the screw holes 88 to screw together such that the cover 78 is fixed on the case body 77.

Three openings are formed in the rear wall 84 of the case body 77. Spouts 70, 71, and 79 are fitted into the respective openings. The spout 70 has the atmosphere communication hole 72 extending in the front-rear direction. The atmosphere communication hole 72 is open in the spout 70 toward both sides of the front-rear direction. With the spout 70 being fitted in the opening of the rear wall 84, the atmosphere communication hole 72 comes into communication with the tank 77A and the outside.

The spout 71 has the inflow hole 73 (an example of the second opening) extending in the front-rear direction. The inflow hole 73 is open in the spout 71 toward both sides of the front-rear direction. With the spout 71 being fitted in the opening of the rear wall 84, the tank 77A, through the inflow hole 73, communicates with the outside. The discharge needle 114 is inserted into the inflow hole 73. Note that the inflow hole 73 may be opened and closed by a valve. In such a case, if the discharge needle 114 is inserted into the inflow hole 73, then the valve switches from the closed state to the opened state.

A spout 92 has the supply hole 93 (an example of the first opening) extending in the front-rear direction. The spout 92 is a component of the aftermentioned pouch 90. The supply hole 93 is open in the spout 92 toward both sides of the front-rear direction. With the spout 92 being fitted in the opening of the rear wall 84, the internal space of a bag 91 of the pouch 90, through the supply hole 93, communicates with the outside. The supply needle 112 is inserted into the supply hole 93. Note that the supply hole 93 may be opened and closed by a valve. In such a case, if the supply needle 112 is inserted into the supply hole 93, then the valve switches from the closed state to the opened state.

Figure 11:
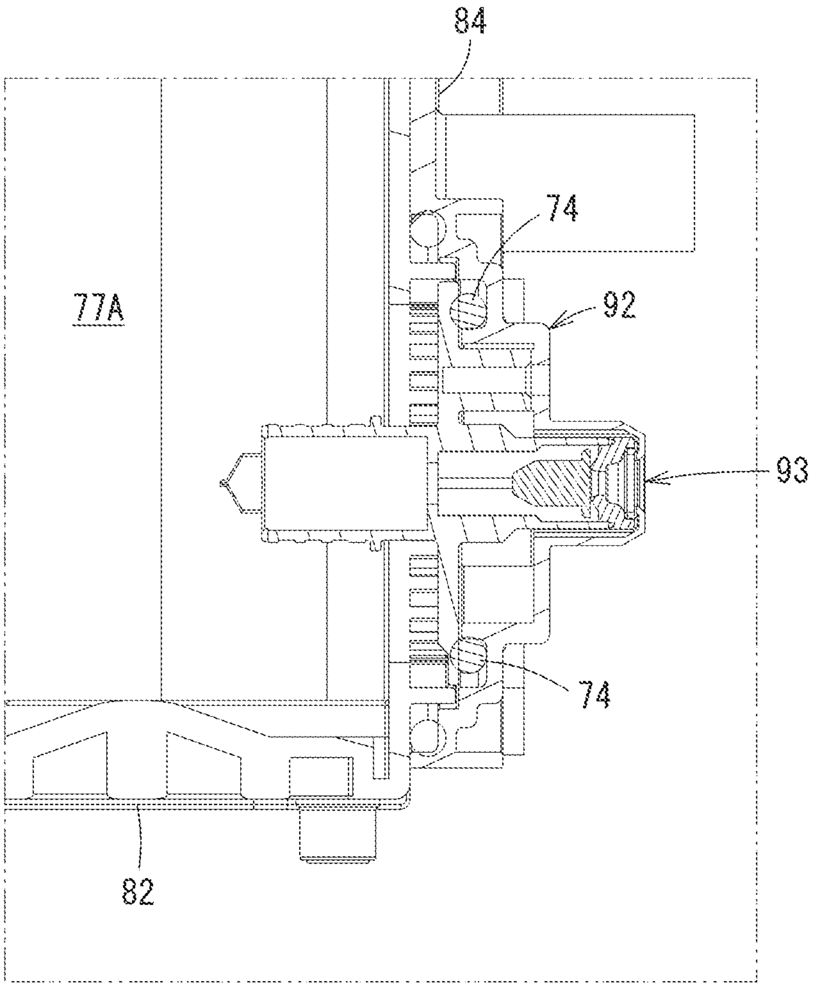
FIG. 11 is a partial cross section view depicting the cross section XI-XI of FIG. 8.

As depicted in FIG. 11, in the opening of the rear wall 84, between the spout 92 and the opening periphery of the rear wall 84, an O-ring 74 is arranged and sealed tightly. Without illustration, between the spouts 70 and 71 and the opening periphery of the rear wall 84, O-rings 74 are also arranged and sealed tightly.

Figure 6:
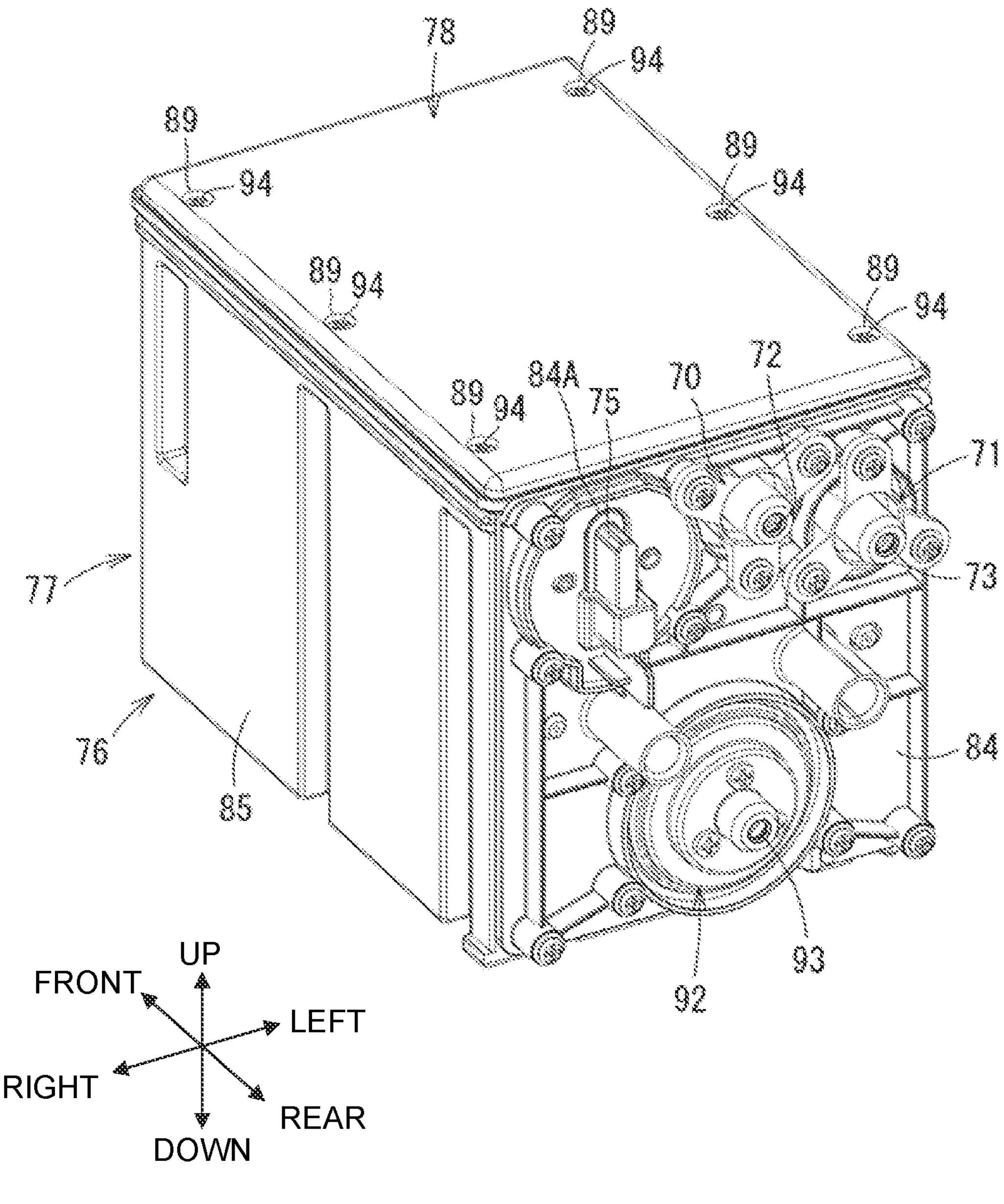
FIG. 6 is a perspective view of a liquid cleaner tank 76.
Figure 7:
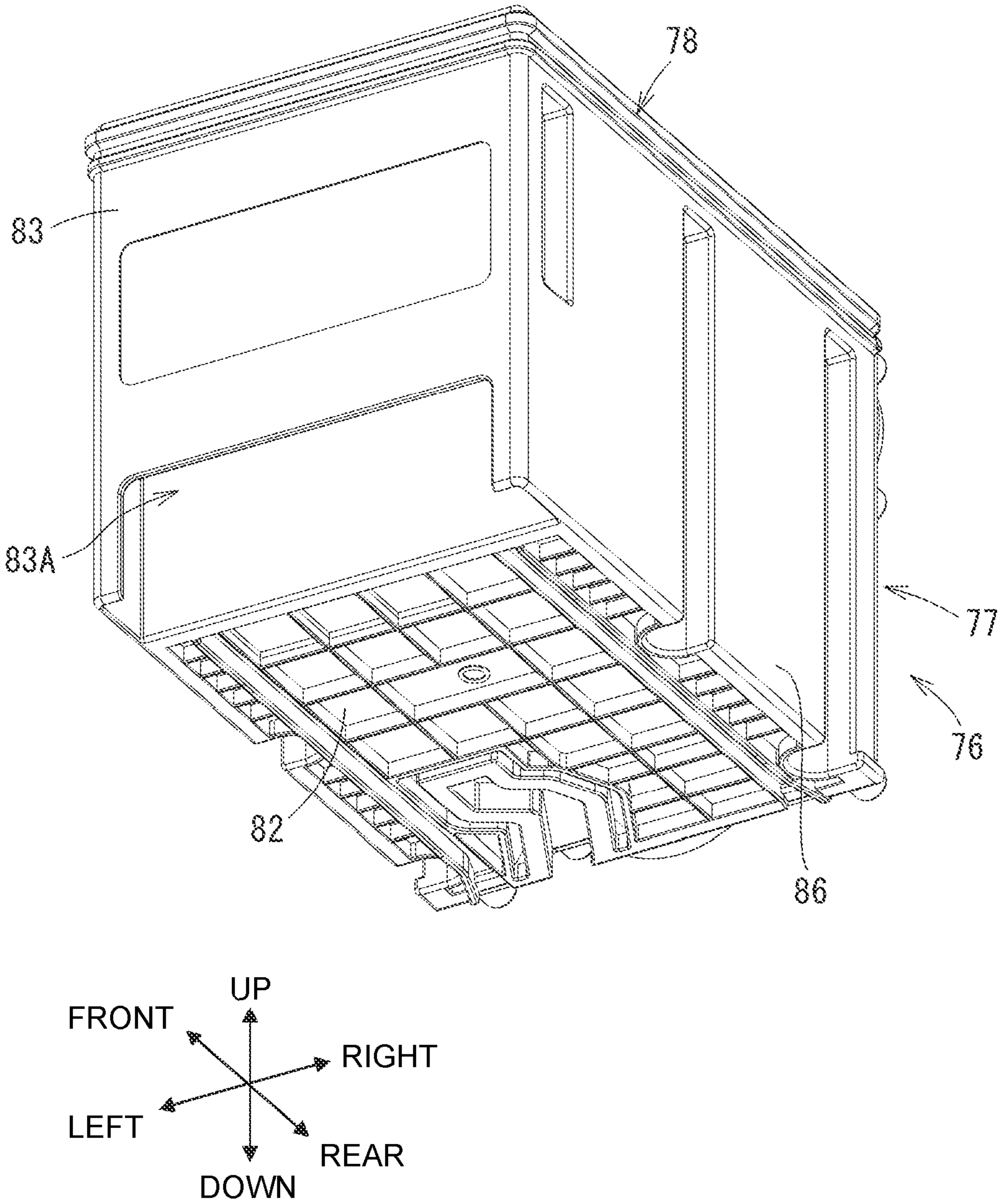
FIG. 7 is another perspective view of the liquid cleaner tank 76.
Figure 8:
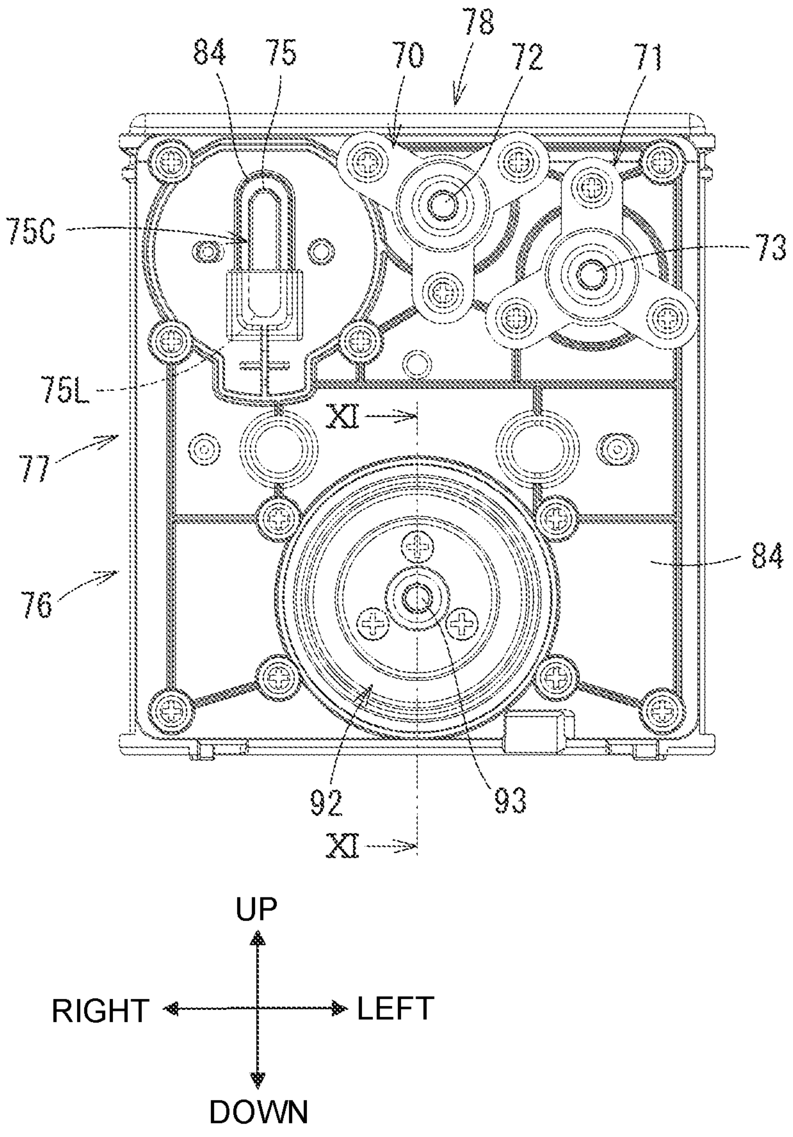
FIG. 8 is a back side view of the liquid cleaner tank 76.

As depicted in FIGS. 6 and 8, the indicator 75 is positioned on the rear wall 84. The indicator 75 is box-like and hollow, made of a member having a light transmission feature. The outer appearance of the indicator 75 is thin and long in the up-down direction. The indicator 75 is exposed to the outside via an opening 84A of the rear wall 84. The internal space of the indicator 75 is in communication with the tank 77A. If the waste liquid stored in the tank 77A increases its level up to the position of the indicator 75, then the waste liquid enters into the internal space of the indicator 75, to form a liquid level at the same height as the tank 77A. Because the indicator 75 is light transmittable, the waste liquid level formed in the internal space of the indicator 75 is observable from the outside. An optical sensor 129 (see FIG. 2) provided in the cartridge installation unit 110 determines whether or not the waste liquid level has reached a predetermined position of the indicator 75. Note that the part between the indicator 75 and the periphery of the opening 84A is sealed tightly with a packing or the like.

As depicted in FIG. 8, in the tank 77A, the atmosphere communication hole 72 is positioned above the inflow hole 73. The inflow hole 73 is positioned above the supply hole 93. The center 75C of the internal space of the indicator 75 according to the up-down direction is positioned above the inflow hole 73. A lower end 75L of the internal space of the indicator 75 is positioned below the atmosphere communication hole 72.

Figure 12:
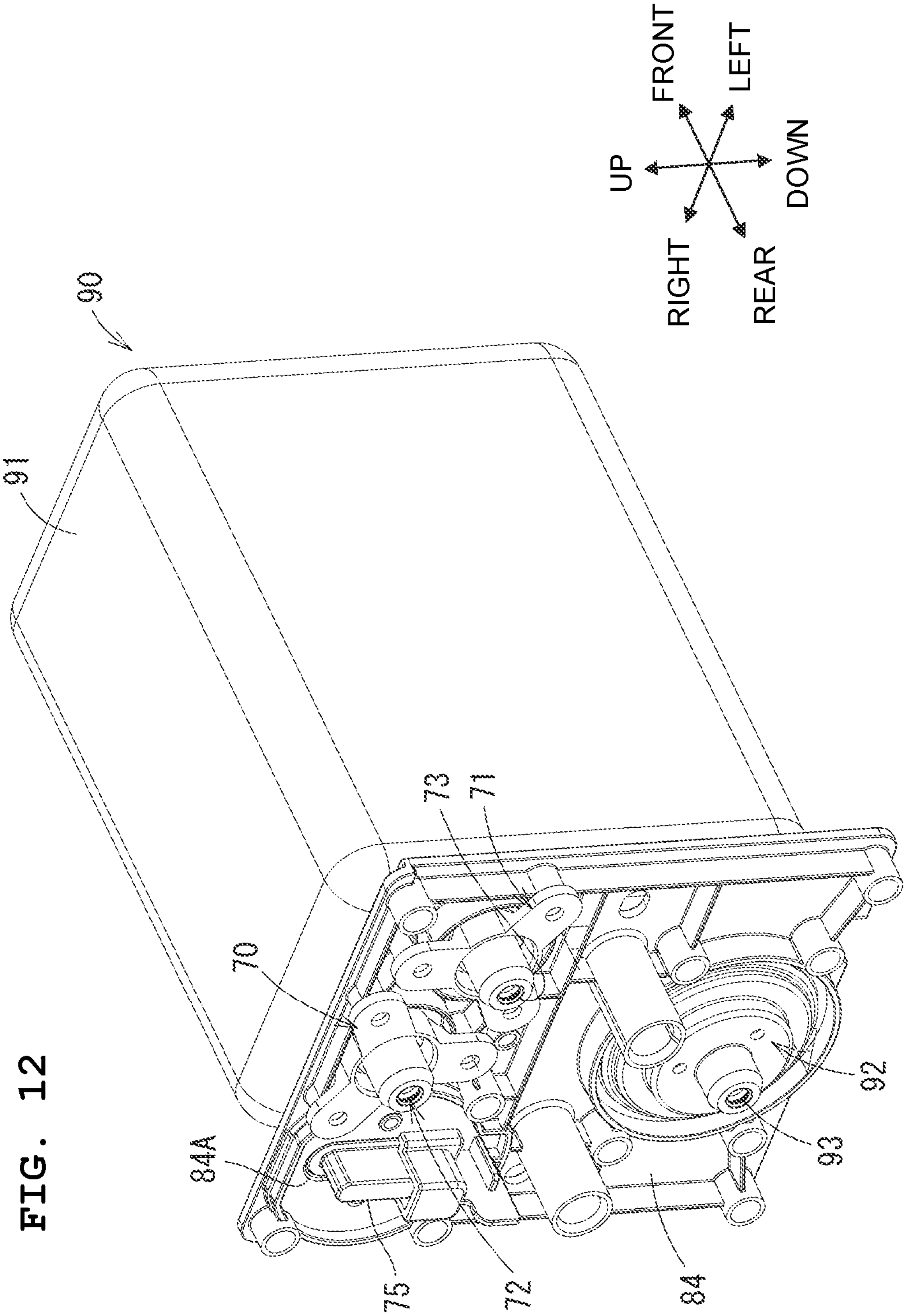
FIG. 12 is a perspective view of a pouch 90.

As depicted in FIG. 10, in the tank 77A of the case body 77, the pouch 90 is accommodated to store the liquid cleaner. As depicted in FIG. 12, the pouch 90 has the flexible bag 91 and the spout 92 (an example of the spout). As depicted in FIGS. 6 and 8, the spout 92 is fitted in the opening of the rear wall 84 of the case body 77, while the bag 91 is positioned in the tank 77A.

As depicted in FIG. 12, the bag 91 can expand into a cube due to a welded sheet made of a synthetic resin. The spout 92 is positioned in the vicinity of the lower end of the bag 91. The spout 92 is a member made of a synthetic resin. The spout 92 is welded around a through hole formed in the bag 91. Note that in FIG. 12, the spouts 70, 71, and 92 are depicted as fitted in the opening of the rear wall 84 of the case body 77. Further, the bag 91 is depicted as expanding into a cubic shape.

The spout 70 is positioned in the vicinity of the upper end of the rear wall 84. The spout 70 is a member made of a synthetic resin. The spout 71 is positioned a little lower than the spout 70 in the vicinity of the upper end of the rear wall 84. The spout 71 is also a member made of a synthetic resin.

The liquid cleaner filling the bag 91 is supplied to the maintenance mechanism 60, and finally discharged as the waste liquid to the tank 77A via the inflow hole 73 of the spout 71. The waste liquid discharged to the tank 77A also includes the ink discharged from the head module 49. Therefore, considering the ink amount included in the waste liquid, the amount of the liquid cleaner filling the bag 91 shall be preferably a little less than the volume of the tank 77A.

Technical Effects of the Embodiment

According to this embodiment, the waste liquid of inflow via the inflow hole 73 is stored in the tank 77A. The liquid cleaner filling the bag 91 of the pouch 90 is positioned in the tank 77A, being separated from the waste liquid stored in the tank 77A. By virtue of this, it is possible to accommodate the liquid cleaner and the waste liquid effectively in the pouch 90 and the tank 77A, respectively.

Further, the bag 91 contracts due to the supply of the liquid cleaner from the pouch 90. The bag 91 contracts as much as the volume of the waste liquid storable space expands in the tank 77A of the case body 77. Because the liquid cleaner supplied from the pouch 90 occupies the better part of the waste liquid, the amount of the liquid cleaner supplied from the bag 91 is almost the same as the amount of the waste liquid flowing into the tank 77A. Therefore, without upsizing the case body 77, it is possible to secure the supply amount of the liquid cleaner and the collection amount of the waste liquid in the liquid cleaner tank 76. Further, the air mixed into the waste liquid is discharged with the air from the tank 77A via the atmosphere communication hole 72. Therefore, even if some air is mixed into the waste liquid, there is still no decrease in the waste liquid amount collectable in the tank 77A.

Further, it is possible to determine the level of the waste liquid stored in the tank 77A from the outside via the indicator 75. Because the center 75C of the internal space of the indicator 75 according to the up-down direction is positioned above the inflow hole 73, it is possible to determine the level of the liquid via the indicator 75 before the level of the waste liquid stored in the tank 77A reaches the inflow hole 73. Further, because the lower end 75L of the internal space of the indicator 75 is positioned below the atmosphere communication hole 72, it is possible to determine the level of the liquid via the indicator 75 before the level of the waste liquid stored in the tank 77A reaches the atmosphere communication hole 72.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

<Modifications>

In the abovementioned embodiment, the waste liquid stored in the tank 77A enters into the internal space of the indicator 75. However, the waste liquid may not enter into the internal space of the indicator 75 but, for example, a float, a rotating member, or the like may move vertically according to the position of the liquid level of the tank 77A in the internal space of the indicator 75.

Further, in the abovementioned embodiment, the liquid cleaner or the waste liquid was explained as an example of the liquid. However, the liquid may also be a liquid preserver or the like filling the head, the flow channels, and the like when the apparatus is not in use over a long period of time.

The present disclosure may include the following aspect. The second opening may be positioned above the first opening.

The tank stores more quantity of the liquid.

The bag of the pouch may be filled with the liquid.

The case may include an atmosphere communication hole for communication between inside and outside of the tank.

The liquid flows into the tank more readily via the second opening.

The atmosphere communication hole in the tank may be positioned above the second opening.

The liquid stored in the tank less readily flows into the atmosphere communication hole.

The case may include an indicator displaying a level of the liquid stored in the tank.

It is possible to determine the level of the liquid stored in the tank from the outside via the indicator.

The indicator may include an internal space allowing the liquid stored in the tank to flow thereinto, and the vertical center of the internal space of the indicator may be positioned above the second opening.

It is possible to determine the level of the liquid via the indicator before the level of the liquid stored in the tank reaches the second opening.

A lower end of the internal space of the indicator may be positioned below the atmosphere communication hole for the communication between inside and outside of the tank.

It is possible to determine the level of the liquid via the indicator before the level of the liquid stored in the tank reaches the atmosphere communication hole.

The first opening, the second opening, and an opening of the atmosphere communication hole in an outer surface of the case may be positioned at an identical lateral surface of the case, and the first opening, the second opening, and the opening of the atmosphere communication hole may be sealed tightly from liquid.

The case may include a main body having an opening at the top, a film welded to the opening of the main body, and a cover fixed on the main body to cover the film.

According to an aspect of the present disclosure, there is provided a liquid discharge apparatus including: the liquid tank set forth above; an installation case installed with the liquid tank; a first needle inserted in the spout, in an installed state of the liquid tank being installed in the installation case; a second needle inserted in the second opening in the installed state; a head configured to discharge the liquid; a maintenance mechanism configured to clean the head; a first liquid circuit for communication between the pouch and the maintenance mechanism via the first needle; and a second liquid circuit for communication between the tank and the maintenance mechanism via the second needle.

The bag of the pouch may be filled with a liquid cleaner to clean the head.

What is claimed is:

1. A liquid container comprising:

a pouch including a flexible bag and a spout with a first opening; and a case with a second opening, the case including a tank configured to store a liquid flowed through the second opening, wherein the spout is fitted into the case, and the bag is positioned in the tank;

wherein the case includes an atmosphere communication hole for communication between inside and outside of the tank.

2. The liquid container according to claim 1, wherein the second opening is positioned above the first opening.

3. The liquid container according to claim 1, wherein the bag of the pouch is filled with the liquid.

4. The liquid container according to claim 1, wherein the atmosphere communication hole in the tank is positioned above the second opening.

5. The liquid container according to claim 1, wherein the case includes an indicator configured to display a level of the liquid stored in the tank.

6. A liquid container comprising:

a pouch including a flexible bag and a spout with a first opening; and a case with a second opening, the case including a tank configured to store a liquid flowed through the second opening, wherein the spout is fitted into the case, and the bag is positioned in the tank; wherein the case includes an indicator configured to display a level of the liquid stored in the tank.

7. The liquid container according to claim 6, wherein a lower end of the internal space of the indicator is positioned below the atmosphere communication hole for communication between inside and outside of the tank.

8. The liquid container according to claim 1, wherein the first opening, the second opening, and an opening of the atmosphere communication hole in an outer surface of the case are positioned at an identical lateral surface of the case, and the first opening, the second opening, and the opening of the atmosphere communication hole are sealed tightly from liquid.

9. The liquid container according to claim 1, wherein the case includes: a main body having an opening at the top; a film welded to the opening of the main body; and a cover fixed on the main body to cover the film.

10. A liquid discharge apparatus comprising:

the liquid container according to claim 1;

an installation case installed with the liquid container;

a first needle inserted in the spout, in an installed state of the liquid container being installed in the installation case;

a second needle inserted in the second opening in the installed state;

a head configured to discharge the liquid;

a maintenance mechanism configured to clean the head;

a first liquid circuit for communication between the pouch and the maintenance mechanism via the first needle; and a second liquid circuit for communication between the tank and the maintenance mechanism via the second needle.

11. The liquid discharge apparatus according to claim 1, wherein the liquid is a liquid cleaner, and the bag of the pouch is filled with the liquid cleaner to clean a head.

12. The liquid container according to claim 6, wherein the indicator includes an internal space allowing the liquid stored in the tank to flow thereinto, and a vertical center of the internal space of the indicator is positioned above the second opening.

13. A liquid container comprising:

a pouch including a flexible bag and a spout with a first opening; and a case with a second opening, the case including a tank configured to store a liquid flowed through the second opening, wherein the spout is fitted into the case, and the bag is positioned in the tank; wherein the case includes: a main body having an opening at the top; a film welded to the opening of the main body; and a cover fixed on the main body to cover the film.

* * * * *